UNITED STATES PATENT OFFICE.

HOWARD W. MATHESON, OF WILMINGTON, DELAWARE, ASSIGNOR TO E. I. DU PONT DE NEMOURS AND COMPANY, OF WILMINGTON, DELAWARE, A CORPORATION OF DELAWARE.

PROCESS OF COATING AND PRODUCT THEREOF.

1,316,913.     Specification of Letters Patent.     Patented Sept. 23, 1919.

No Drawing.     Application filed December 13, 1915. Serial No. 66,462.

*To all whom it may concern:*

Be it known that I, HOWARD W. MATHESON, of Wilmington, in the county of New Castle, and in the State of Delaware, have invented a certain new and useful Improvement in Processes of Coating and Product Thereof, and do hereby declare that the following is a full, clear, and exact description thereof.

My invention relates particularly to a process of coating with a solution of cellulose, but especially to a process of this character designed to produce a non-inflammable product.

The object of my invention is to provide coatings, as for example in the production of artificial leather, which are non-inflamable. In producing the coatings made in accordance with my invention, I make use of a cuprammonium cellulose compound, which is made by dissolving cellulose in a mixture of copper hydroxid and ammonia. Coatings made in this manner are non-inflammable. A further object of my invention is to provide a process and product of this character in which the product obtained may be provided with any suitable color by the application of dyes or pigments. A further object of my invention is to provide a coating of this character which shall have the desired pliability, the same being preferably accomplished by the incorporation of an oil, either mineral or vegetable. Preferably, however, the oil which I use is a mixture of drying and semi or non-drying vegetable oils.

While my invention is capable of being carried out in many different ways, for the purpose of illustration I shall describe only one form of my invention. As a preferred embodiment of my invention, I may proceed as follows:

A good quality of bleached and purified cotton is treated with a solution of caustic soda of the following strength:

30 degrees Baumé
Equivalent to $\begin{cases} 24\% \text{ NaOH} \\ 76\% \text{ water} \end{cases}$ and is allowed to remain in contact with the same from one to three days. The cotton is then washed free from the alkali. The cotton is now dissolved in a mixture of copper hydroxid and ammonia in the following proportions:

For every pound of dry cotton, 6 pounds of concentrated ammonia and one-half pound of copper hydroxid is used.

It will be understood that pigments or dyes of any desired character may be mixed with the composition. A number of coats of this material are then applied successively to a mercerized or non-mercerized fabric, or a sheet of any other suitable supporting material, and the ammonia is recovered in any suitable way. The fabric is then dried, and thereafter the surface is treated with a mixture of 90 parts boiled linseed oil and 10 parts castor oil, dissolved in 300 parts of gasolene. The material is then embossed in any desired grain and is thereafter festooned so as to allow the same to dry. The embossing causes the oil to penetrate and soften the coating.

While I have described my invention above in detail, I wish it to be understood that many changes may be made therein without departing from the spirit of my invention.

I claim:—

1. The process of producing artificial leather which comprises applying merely a surface coating of a solution of cuprammonium cellulose to a sheet of supporting material.

2. The process of producing artificial leather which comprises applying merely a surface coating of a solution of cuprammonium cellulose, containing a pigment, to a sheet of supporting material.

3. The process of producing artificial leather which comprises applying a solution of cuprammonium cellulose to a sheet of supporting material, and then applying an oil to the coating to soften the same.

4. The process of producing artificial leather which comprises applying a solution of cuprammonium cellulose to a sheet of supporting material, and then applying a vegetable oil to the coating to soften the same.

5. The process of producing artificial leather which comprises applying a solution of cuprammonium cellulose to a sheet of supporting material, then applying an oil to the coating to soften the same, and then embossing the same.

6. An artificial leather comprising a deposit of cuprammonium cellulose merely on the surface of a sheet of supporting material.

7. An artificial leather comprising a deposit of cuprammonium cellulose containing a pigment merely on the surface of a woven fabric.

8. An artificial leather comprising a deposit of cuprammonium cellulose, containing an oil, on the surface of a sheet of supporting material.

9. An artificial leather comprising a deposit of cuprammonium cellulose, containing a vegetable oil, on the surface of a sheet of supporting material.

In testimony that I claim the foregoing I have hereunto set my hand.

HOWARD W. MATHESON.

Witnesses:
BLANCHE GAGNON,
TELESPHORE OUIMET.